April 11, 1967 W. T. AKIN ET AL 3,313,902
COAXIAL ELECTRODE ASSEMBLY
Filed Jan. 19, 1965 4 Sheets-Sheet 3
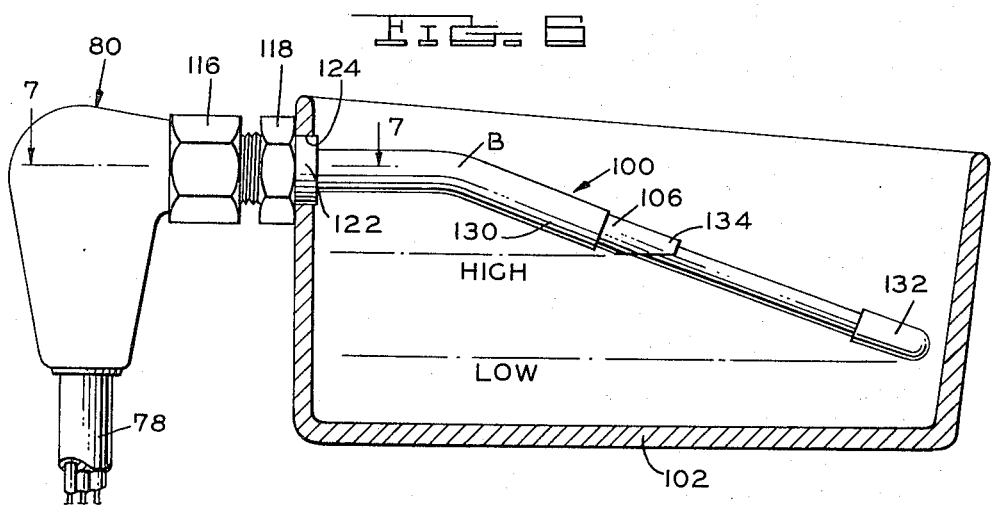
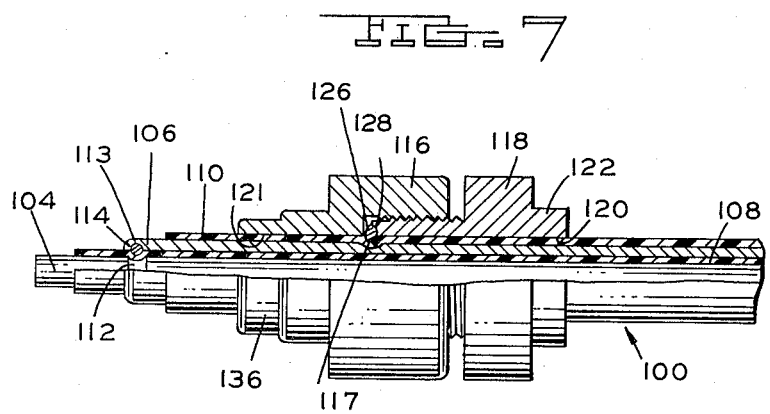
INVENTORS
WELLING T. AKIN
EDGAR A. BONGORT
BY
*Burton & Parker*
ATTORNEYS

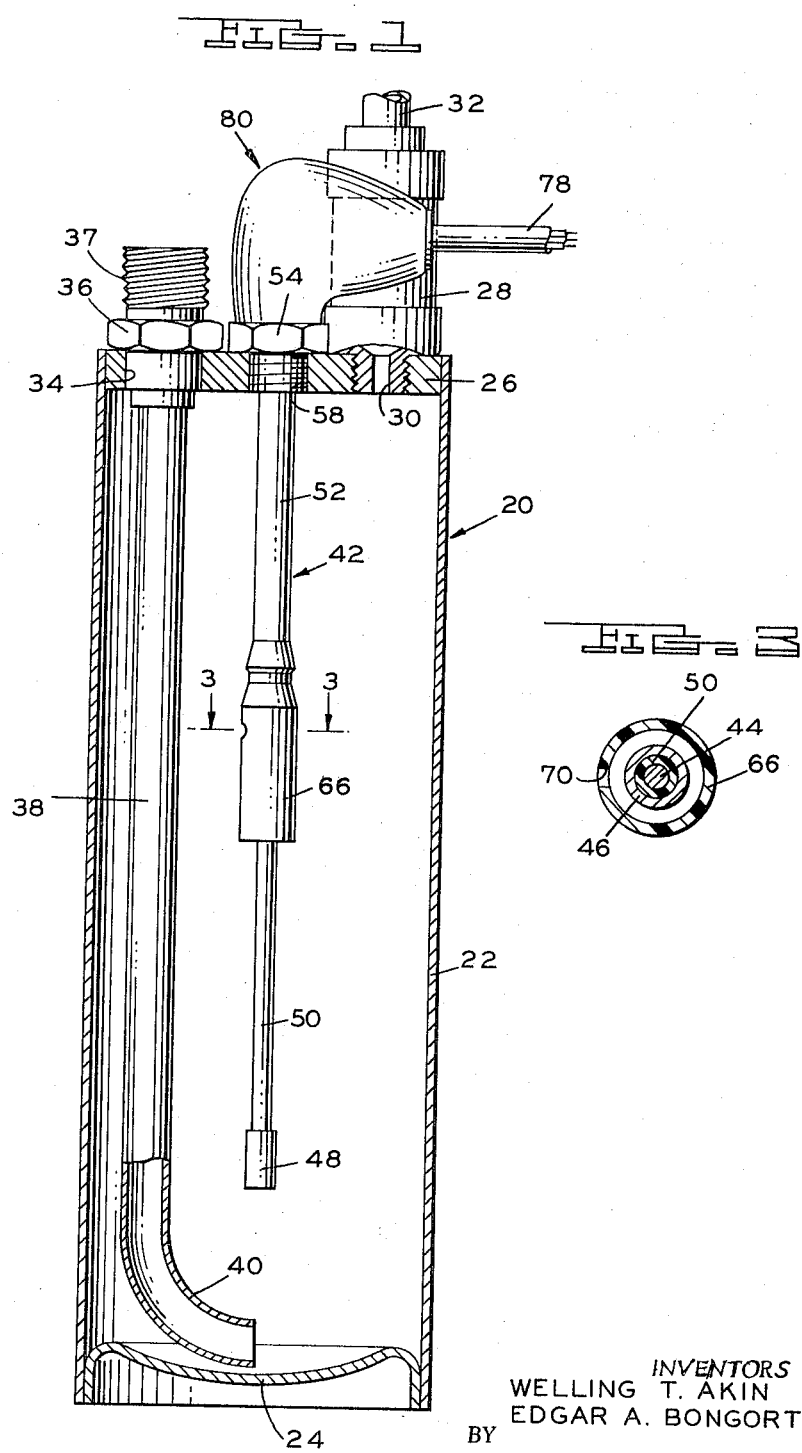

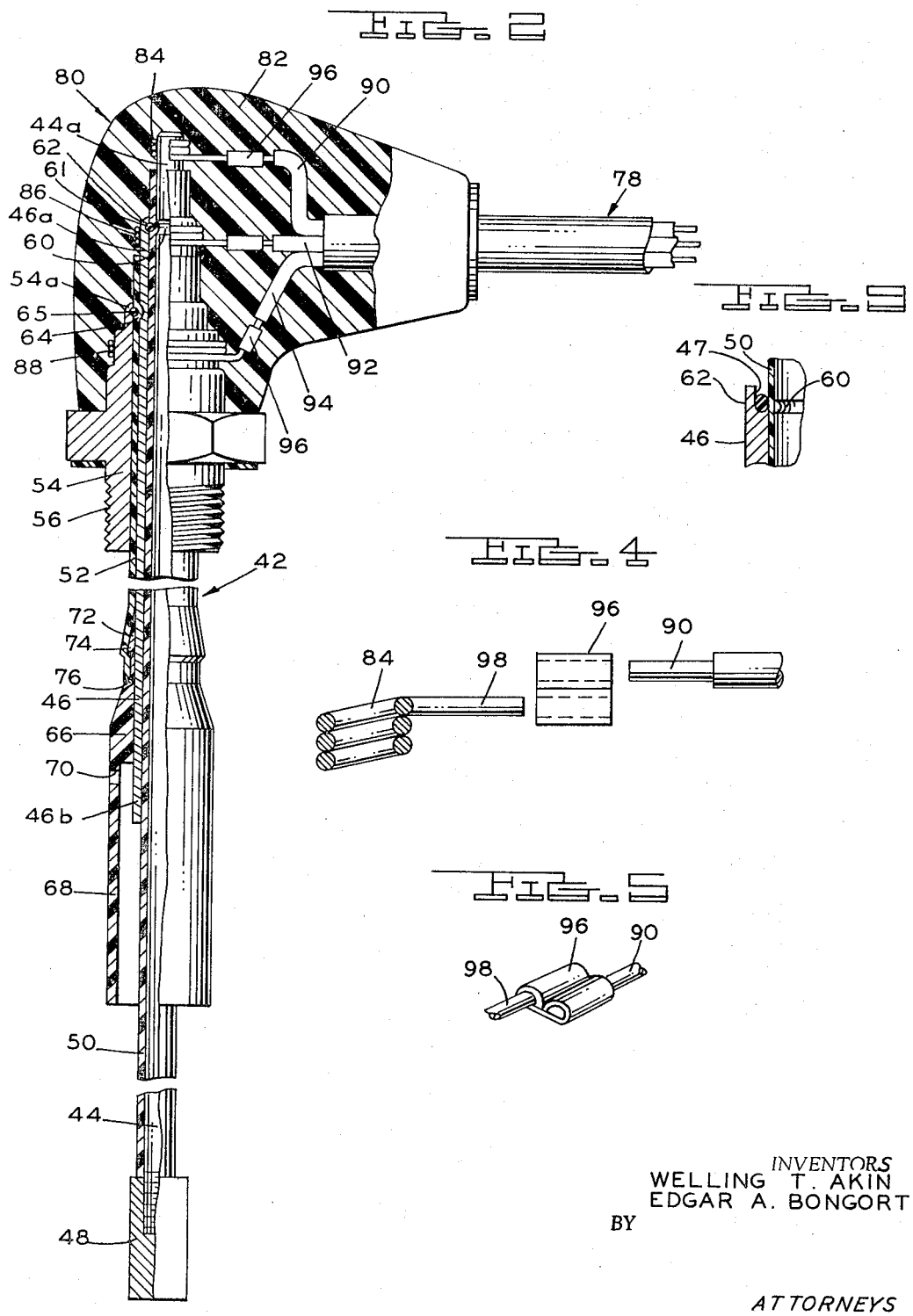

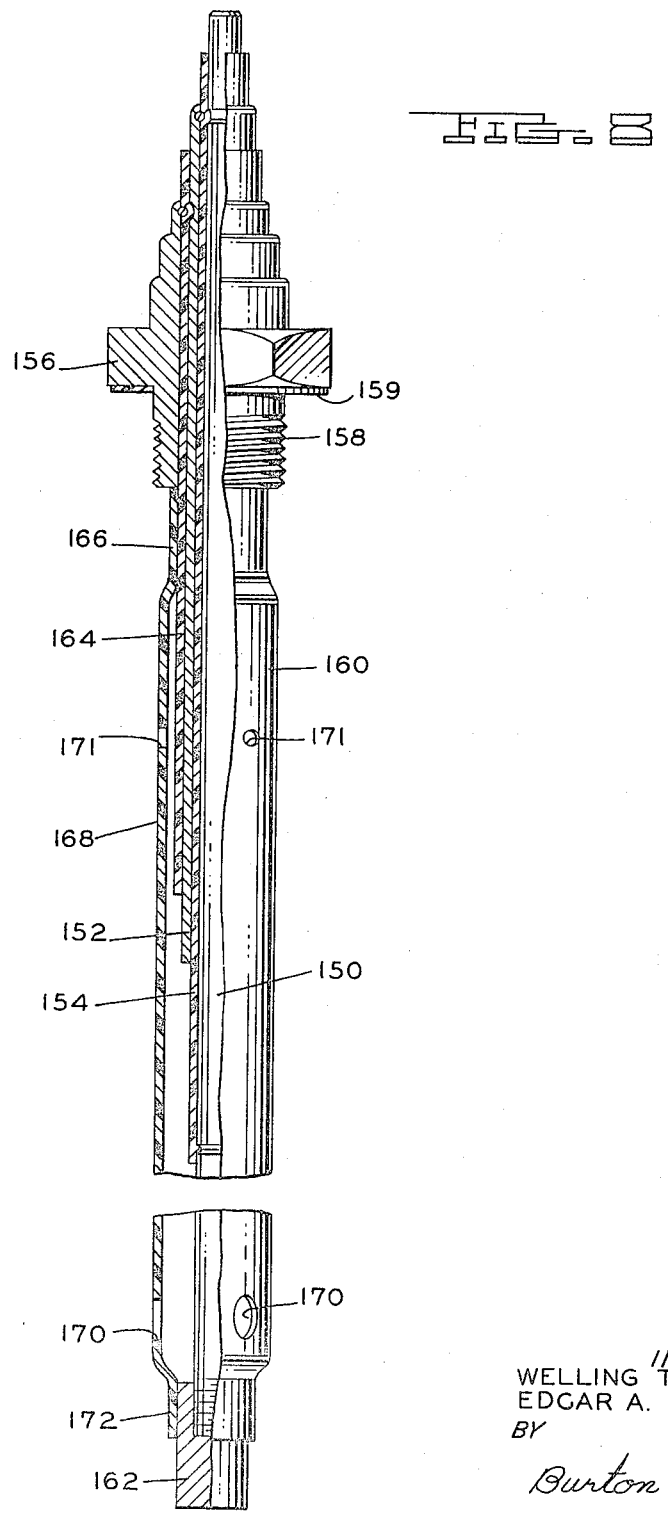

United States Patent Office 3,313,902
Patented Apr. 11, 1967

3,313,902
COAXIAL ELECTRODE ASSEMBLY
Welling T. Akin, Birmingham, and Edgar A. Bongort, Southfield, Mich., assignors to B/W Controller Corporation, Birmingham, Mich., a corporation of Michigan
Filed Jan. 19, 1965, Ser. No. 426,522
18 Claims. (Cl. 200—152)

This invention relates to electric liquid level control devices, and in particular to a new and improved electrode assembly for such a device.

U.S. Patent 2,798,135 discloses a prior art electrode assembly comprising concentric inner and outer electrodes separated by a plastic sleeve which electrically insulates the electrodes from each other, the assembly being particularly adapted for use as a liquid level sensor for carbonating tanks or other pressure vessels. One problem to be overcome is leakage of the fluid pressure in the tank axially along and through the concentric electrodes. Such patent suggests circumferentially crimping the outer electrode tube radially against the underlying plastic sleeve at a plurality of axially spaced locations, to provide a series of inwardly projecting beads on the outer tube which squeeze the insulating sleeve against the central electrode at a plurality of axially spaced locations. We have found that while a plurality of inwardly projecting annular beads on the outer electrode is often effective, it is not reliable, particularly if the electrode units are not put into use rather promptly. A certain amount of cold flow of the plastic sleeve seems to occur which reduces and sometimes destroys the effectiveness of the seal.

Therefore a primary object of the present invention is the provision of an electrode unit having concentric inner and outer electrodes separated by a plastic insulating sleeve wherein simple and effective means are provided for assuring that a fluid-tight seal will always subsist despite any cold flow of the plastic sleeve.

Another object of the invention is the provision of simple and reliable sealing means at the juncture of the electrode unit and the coupling or fitting by which it is mounted in the tank wall. In one form of such sealing means the electrode unit may be adjustably positioned in the fitting to vary the effective liquid level sensing position of the electrodes in the tank, while in another form the electrode unit and fitting are integral and the unit is not adjustable in the fitting.

Another object is the provision of an electrode assembly having a shield preventing a false sensing of liquid level or other malfunction due to splashing or agitation of the liquid whose level is being controlled.

Another object is the provision of an electrode assembly having an electrical receptacle releasably coupled to the electrodes whereby the assembly may be coupled electrically to control devices or the like simply by engaging the receptacle over the end of the electrode assembly.

Other objects, advantages, and meritorious features will more fully appear from the following specification, claims and accompanying drawings wherein:

FIG. 1 is a vertical sectional view of a liquid carbonating tank showing an electrode assembly embodying the invention mounted therein and comprising an electrode unit and electrical connector therefor;

FIG. 2 is a side elevation, partly in section, of the electrode assembly shown in FIG. 1;

FIG. 3 is a cross-sectional view taken along line 3—3 of FIG. 1;

FIG. 4 is an exploded view, partly in section, of a slip connector for the electrodes showing clip means for securing the connector to an electric conductor;

FIG. 5 is a perspective view of the parts of FIG. 4 shown in assembled condition;

FIG. 6 is a vertical sectional view of a liquid tank showing a modified form of electrode assembly embodying the invention;

FIG. 7 is a partial view of the electrode assembly of FIG. 6, partly in section, taken along line 7—7 of FIG. 6;

FIG. 8 is a side elevation, partially in section, through a modified form of shielded electrode unit; and FIG. 9 is a fragmentary view of the upper end of the outer electrode tube prior to its swaging.

In FIG. 1 there is shown a liquid carbonating tank 20 having a cylindrical side wall 22 and a curved bottom wall 24 integrally secured together as by welding. The top of the tank is hermetically closed by a closure plate 26 having apertures through which project the parts described herebelow.

A liquid inlet fitting 28 having a check valve therein is threadedly received in a suitable aperture in plate 26, and includes an inlet passage 30 opening into the tank 20 and a liquid supply pipe 32 connected to a pump or the like (not shown) to supply water or other liquid to the tank 20. There is also a second fitting (not shown) threaded into plate 26 for the introduction of carbonic gas under pressure. Such may be identical to fitting 28 and adapted for connection through suitable pressure control devices to a cylinder of liquified carbon dioxide in a well-known manner. Plate 26 also exhibits an unthreaded aperture 34 within which there is secured as by welding a liquid outlet fitting 36, the upper end of which is threaded as at 37 for connection to a pipe or hose. A liquid discharge tube 38 projects into the tank 20 from fitting 36 and terminates in an inwardly curved portion 40 having its open end adjacent the bottom tank wall 24 approximately at the centerline of the tank. Those parts of the carbonator described hereinabove are conventional in the art and form no part of the instant invention.

An improved electrode assembly embodying the invention is indicated generally by the numeral 42 in FIGS. 1 and 2, and comprises an electrode unit and an electrical connector 80. The electrode unit comprises telescopically connected inner and outer electrodes 44 and 46 electrically insulated from each other by an intervening dielectric sleeve 50, with opposite ends of the electrodes being exposed for purposes hereinafter explained. A coupling or bushing 54 is telescoped over the electrode unit with an intervening dielectric sleeve 52 separating the outer electrode 46 from the coupling. Improved sealing means are provided for sealing the electrodes, sleeves and coupling against leakage of fluid pressure axially thereof. A cylindrical or tubular splash shield 66 may be provided which is supported on the electrode assembly and defines a chamber about the exposed end 46b of the outer electrode to prevent false liquid level sensing. The electrode unit is shown disposed vertically in the tank 20. Electrode 44 projects below electrode 46, and is provided with a threaded lower end to receive an enlarged tip 48 of carbon or graphite in accordance with common practice in the art.

More specifically there is interposed between the electrode rod 44 and the electrode tube 46 an insulating sleeve or tube 50 made of a suitable deformable dielectric material such as plastic or the like, polyvinyl chloride being suitable for this purpose, the opposite end portions of which project beyond the ends of tube 46 and grippingly encircle the rod 44, leaving however, the upper end 44a of the rod and the carbon tip 48 exposed, as shown in FIG. 2. A second insulating sleeve or tube 52 of the same material as sleeve 50 snugly encircles electrode tube 46 terminating intermediate opposite ends of the tube to leave the ends exposed, as at 46a and 46b. An axially bored fitting or coupling member 54 is received over sleeve 52, and is provided with an externally threaded length 56 for reception within a threaded aperture 58 in the closure plate 26 of tank 20.

As shown in FIGS. 2 and 9, inner electrode rod 44 exhibits a circumferential groove 60 spaced from the outer end thereof. An elastmeric O-ring 61 encircles tube 50 radially opposite such groove. Outer electrode tube 46 has its upper end counterbored as at 47 to form a lip 62 which is inwardly rolled or swaged radially opposite the groove 60 and the rod to compress the O-ring and force the sleeve or tube 50 into the groove 60 to the position shown in FIG. 2. The contraction of the O-ring by the swaging or rolling of the lip places the O-ring under compression and the inward circumferential force of the O-ring under the influence of the lip 62 displaces the tube 50 forcibly into groove 60, forming a fluid-tight seal between the rod 44 and the tube 46 and in addition preventing relative axial movement therebetween.

The upper end of bushing 54 is counterbored similar to that of electrode tube 46 as shown in FIG. 9. A circumferential groove 64 is machined in electrode 46 spaced from the upper end thereof. An elastomeric O-ring 65 is slipped over tube or sleeve 52 and positioned radially opposite groove 64. The lip 54a at the upper end of the fitting is then swaged or rolled over the O-ring to compress it radially and cause it to contract about insulating sleeve 52, in turn forcing the sleeve into the groove 64 to effect a fluid-tight seal between the fitting 54 and the outer electrode tube 46. This squeezing of the O-ring and sleeve 52 also locks the electrode unit in the fitting against displacement.

The elastomer selected for the manufacture of the O-rings 61 and 65 may be that normally used for fluid pressure sealing O-rings. In any event it should be of sufficient elasticity so that it will continuously urge the underlying sleeve forcibly into the respective grooves 60 and 64 despite tendency of the underlying sleeve to thin out slightly with cold flow. It will be noted that the O-rings are entrapped on three sides by the overlying swaged lip. The end of the lip is disposed adjacent the sleeve immediately above the O-ring to prevent extrusion of the O-ring.

In swaging or rolling the lip 62 and the lip 54a the respective O-rings are contracted about the sleeve as aforesaid. This contraction may arise from either or both of two actions of the lip. As shown in FIG. 9 the O-ring is somewhat flattened in cross section prior to swaging of the lip. When the lip is swaged or flared over an axial loading is imposed on the O-ring tending to increase its cross-sectional radial dimension and forcing its inside surface against the sleeve to in turn press the sleeve tightly into the groove. This axial compression of the O-ring therefore serves to load the O-ring and contribute to the sealing action. During the rolling or swaging of the overlying circumferential lip the ring is also radially compressed and this too contributes to loading of the ring and establishment of the seal.

The electrode assembly 42 functions to control the level of liquid within tank 20. As stated above, a pump is provided to pump water or other liquid into the tank through passage 30 in fitting 28. When the liquid level in tank 20 falls below the lower end 48 of electrode 44, the pump is started to supply water to the tank. When the level of the water in the tank reaches the bottom of the upper electrode 46 the pump is automatically stopped. Thus the liquid level in the tank 20 is maintained between the lower ends of the two electrodes 44 and 46.

In a carbonator of the character shown, the liquid is delivered to the tank through passage 30 in a jet stream under pressure, and the carbon dioxide is also delivered under pressure, causing vigorous agitation of the liquid in the tank. As the liquid may splash against the lower end of electrode 46 when the actual level is much lower, giving a false reading and thus stopping the pump, the electrode 46 is provided with a tubular shield 66 having a lower skirt 68 spaced from the electrode and extending downwardly therebeyond as shown in FIG. 2. Shield 66 is provided with a vent hole 70 on opposite sides thereof. The upper end of the shield is inwardly tapered as at 72 for slidable reception between tube 46 and sleeve 52 to be gripped therebetween, with a bead 74 assisting to hold the parts assembled. The lower end of sleeve 52 abuts against a shoulder 76 on the shield, which serves as a stop to prevent the shield from being improperly positioned. When thus assembled the liquid must rise in the shield 66 to contact the electrode tube 46, insuring against agitated liquid splashing up on the electrode to stop the pump prematurely.

The electrode assembly 42 is coupled to an electrical control device such as a relay (not shown) through a cable 78 which is releasably coupled to the upper ends of the electrodes 44 and 46 and coupling 54 by means of the receptacle 80 shown in FIG. 2. The receptacle 80 includes a cap 82 of molded plastic material such as polyvinyl chloride or the like, and a plurality of electrically conductive slip connectors 84, 86 and 88 embedded in the plastic. Each of these slip connectors is in the form of a helical wire coil which is secured to a respective end of one of the conductors 90, 92 and 94 of cable 78 by a clip 96 as shown most clearly in FIGS. 4 and 5.

Each slip connector, such as the connector 84 of FIG. 4, is formed with a projecting end portion 98 for insertion into the clip 96, which is suitably formed of sheet metal or the like to accommodate the connector end and the wire 90. Once the connector end 98 and wire end 90 are inserted into the passages in the clip 96, the clip is crimped about the wires as shown in FIG. 5 to provide a secure connection therebetween. In making the receptacle 80, the slip connectors 84, 86 and 88 are first connected to the wires 90, 92 and 94 respectively by the crimp connectors 96, and the slip connectors then mounted on a dummy core pin similar in dimension to the upper end of the electrode assembly 42, and the plastic material molded about the connectors and wires to form the cap 82. When the plastic has cured, the dummy core pin is removed, leaving a stepped cylindrical cavity therein corresponding substantially to the configuration of the upper end of electrode assembly 42. Preferably the slip connectors are placed under slight tension, so that upon completion of the receptacle they will contract to an inside diameter slightly less than the outside diameter of the upper ends of the electrode rod 44, the electrode tube 46 and the coupling 54. Thus when the electrode assembly 42 is inserted into the receptacle 80, the connectors 84, 86 and 88 will releasably grip the respective portions of the electrode assembly, preventing accidental disengagement. In addition to providing a convenient releasable connection between the electrode assembly 42 and the electrical cable 78, the receptacle 80 may be positioned on the electrodes in any desired position of rotation, or may be rotated while coupled to the electrodes.

The electrically conductive wall 22 of tank 20, coupling 54, slip connector 88 and wire 94 provide a path for the flow of electricity which is common to both of the electrode circuits for controlling the pump supplying water or other liquid to the tank. One circuit includes electrode tip 48, electrode 44, connector 84 and conductor 90. The second circuit includes electrode 46, connector 86, and conductor 92. As the liquid in the tank is electrically conductive, when its level falls below tip 48, the electrical connection between the tip and tank wall 22 is broken, operating a suitable control to start the pump. Also, when the liquid rises to contact the lower end of electrode 46, a circuit is completed to a control operable to stop the pump. Thus the liquid level in the tank is maintained between limits determined by the positions of the electrode tip 48 and the lower end of electrode tube 46.

In FIGS. 6 and 7 is shown a modified electrode unit 100 particularly adapted for side wall mounting. The electrode unit comprises an inner electrode rod 104 and an outer electrode tube 106, together with an inner dielectric sleeve 108 and an outer dielectric sleeve 110, both of which are of the same material heretofore described for the sleeves of the FIG. 1 embodiment. These electrode parts are assembled in the same manner as with the corresponding parts of FIGS. 1–5 so that such need not be described in great detail. Rod 104 has a circumferential groove 112 adjacent its outer end into which sleeve 108 is sealingly urged by an O-ring 113 under swaged wall portion 114 of tube 106, to form a fluid-tight seal and prevent relative axial movement, as hereinabove described with reference to electrode assembly 42.

In the embodiment of FIGS. 6 and 7, a two-piece coupling comprising a nut member 116 and a bushing member 118 is provided for mounting the electrode unit in the tank wall. The coupling members are threaded for engagement as shown, and exhibit coaxially aligned bores 120 and 121 within which the electrode unit, comprising electrodes 104 and 106 together with sleeves 108 and 110, is slidably receivable. One of the coupling members, in this case the male member 118, is provided with a shouldered end portion 122 receivable in a suitable aperture 124 in the side wall of tank 102. End portion 122 may be a smooth cylinder, as shown, in which case it may be welded within the aperture to provide a fluid pressure-tight seal therewith, or it may be threaded for engagement with corresponding threads in the tank aperture, or it may be secured in the tank in any other convenient sealed fashion.

A resiliently deformable sealing ring such as an O-ring 126 is slidably received over the electrode unit and is positioned thereon radially opposite a groove 117 in electrode tube 106, as shown in FIG. 7. Coupling member 118 has a beveled bore entrance providing a sealing surface 128 which is adapted to engage ring 126 and contract it radially against sleeve 110 when the nut 116 is tightened, urging the sleeve into the groove 117 in tube 106. With the coupling members 116 and 118 threaded together as in FIG. 7, sealing ring 126 and sleeve 110 cooperate to effect a fluid pressure-tight seal and in addition serve to prevent relative movement of the electrode unit 100 relative to the coupling members. The elasticity of O-ring 126 maintains a fluid pressure-tight seal between the periphery of the electrode unit and the coupling despite cold flow of sleeve 110 at the O-ring.

As shown in FIG. 6, the portion 130 of the electrode projecting into the tank 102 is angularly displaced or bent with respect to the axis of the coupling members 116 and 118. Thus, before tightening nut 116, the electrode unit may be rotated within the coupling whereby the ends 132 and 134 of electrodes 104 and 106 respectively, may be positioned at different heights in the tank 102 to maintain the liquid level at different heights. The electrical receptacle 80 and cable 78 are identical to the similarly numbered parts of FIGS. 1 and 2 and need not be further described. Coupling member 116 exhibits a cylindrical end portion 136 engageable with slip connector 88 in the receptacle 80 to effect an electrical connection therebetween.

To assemble the device in tank 102, the coupling member 118 is first suitably secured permanently in the tank side wall as described, and the electrode unit is slipped through member 118 from the inside of the tank. O-ring 126 and coupling member 116 are then slid over the electrode unit which is rotated to position the electrode tip 132 and tube end 134 at the desired heights within tank 102. If the bend B in the electrode unit is made more gradual then the unit may be inserted from outside the tank. Coupling members 116 and 118 are then tightened together, securing the unit 100 against movement and sealing it in the coupling, whereupon the socket 80 is telescoped over the projecting end of the electrode unit and coupling member 116 to effect the electrical connection through cable 78 to the desired control relays, switches or the like. When the liquid level falls below electrode tip 132, the circuit between the electrode 104 and coupling 116–118 (through the walls of tank 102) is interrupted, actuating a control to start a pump or open a valve for supplying water to the tank 102. Conversely, when the level reaches electrode end 134, a circuit is completed between electrode 106 and the coupling through a control to stop the pump or close a valve to interrupt liquid supply to the tank 102.

In FIG. 8 a further modification of the electrode assembly is shown. In this arrangement the rod and tubular electrodes 150 and 152 respectively and the dielectric sleeve 154 correspond to similar parts in FIG. 2, and are sealed together and within the coupling 156 similar to that of the FIG. 2 construction. The coupling is provided with a threaded length 158 for screwed reception in the tank wall with a sealing washer 159 for sealing it in the wall. A shield 160 of dielectric tubing is supported at upper and lower ends on the electrode unit, and extends from the threaded coupling to the tip 162. The shield is preferably formed of a heat-shrinkable plastic such as polyolefin. It is telescoped over the electrode unit and the upper and lower ends are heat-shrunk as at 166 and 172 tightly about the sleeve 164 and the tip 162. Heat is not applied throughout a major portion of its length whereby an enlarged portion is provided as at 168 throughout such major portion of its length. Such enlarged portion provides a liquid chamber communicating with the interior of the tank through liquid flow apertures 170 and vents 171. The chamber around electrode 152 formed by the shield is substantially closed except for the apertures 170 and vents 171 spaced from the exposed end of the electrode 152. This shield is particularly suitable where there may be substantial splashing or agitation of the liquid in the tank and it is necessary to provide a more complete shielding of the electrode 152 than is afforded by the FIG. 2 design.

It has been found that the amount of projection of sleeve 154 below electrode tube 152 must not be less than about ¾" when the rod 150 is ⅛" diameter to positively prevent unintentional short-circuiting between the electrodes.

What is claimed is:

1. The method of making an electrode assembly having a pair of coaxially arranged electrodes electrically insulated from one another and sealed against the passage of fluid pressure therebetween comprising the steps of telescoping one of the electrodes within a closely fitting relatively thin sleeve of deformable dielectric plastic, telescoping the other electrode over the sleeve to electrically insulate the electrodes from one another by the intervening sleeve, positioning an elastomeric sealing ring between one of the electrodes and the sleeve, and radially and circumferentially compressing the sealing ring between the sleeve and said one electrode to effect a fluid pressure seal therebetween and causing the sleeve to deform against the other electrode to effect a fluid pressure seal therewith.

2. In an electrode assembly: telescopically connected electrodes electrically insulated from each other by an intervening sleeve of deformable dielectric plastic, one of said electrodes provided with an annular groove with the sleeve bridging the groove, and an elastomeric sealing ring disposed between the other electrode and the sleeve radially opposite the groove and in radial and circumferential compression squeezing the sleeve into the groove and establishing fluid pressure seals between the electrodes and sleeve.

3. The invention as defined in claim 2 characterized in that said groove is provided in the surface of the inner electrode and the other electrode is swaged inwardly at the sealing ring to circumferentially and radially compress it against the sleeve forcing the sleeve into the groove.

4. In an electrode assembly, an electrode unit comprising elongated rod-like and tube-like electrodes telescoped together with an intervening sleeve of deformable dielectric plastic disposed therebetween; an annular groove in the surface of the rod-like electrode; an annular ring of elastomeric material encircling the dielectric sleeve opposite the groove and beneath the tube-like electrode; and the tube-like electrode adjacent the ring being circumferentially swaged inwardly tightly contracting the ring about the dielectric sleeve circumferentially pressing the sleeve radially into the groove to provide a fluid pressure seal between the electrodes with the ring under elastic compression.

5. The invention as defined in claim 4 characterized in that said portion of the tube-like electrode which is swaged radially inwardly comprises an annular lip at one end of such electrode defining an annular sealing ring-receiving pocket encircling the sleeve opposite the groove, and the sealing ring is disposed in said pocket and the lip is circumferentially radially inwardly swaged reducing the pocket to tightly squeeze the ring against the sleeve.

6. The invention as defined in claim 4 characterized in that the tube-like electrode is provided with a circumferential annular groove, a coupling is telescoped over the tube-like electrode adjacent the groove with an intervening sleeve of deformable dielectric plastic disposed therebetween, an elastomeric annular ring encircles such sleeve opposite the groove therebeneath, the annular sealing ring encircling and contracting means on the coupling overlies and radially inwardly and circumferentially squeezes the sealing ring against the underlying sleeve urging the sleeve into its respective groove to establish and maintain a resilient seal between the coupling and tube-like electrode.

7. The invention as defined in claim 6 characterized in that the sealing ring contracting means comprises an annular wall portion of the coupling circumferentially overlying the sealing ring and radially depressed inwardly squeezing the ring between it and the sleeve.

8. The invention as defined in claim 6 characterized in that said means comprises an annular lip at one end of the coupling defining an annular pocket with the sealing ring in the pocket and the lip circumferentially swaged inwardly reducing the pocket to tightly squeeze the ring against the underlying sleeve.

9. The invention as defined in claim 6 characterized in that the coupling includes threadedly connected nut and bushing members defining therebetween a sealing ring-receiving pocket a wall of which is shiftable axially against the sealing ring as the members are screwed together to squeeze the ring in the pocket tightly against the underlying sleeve.

10. An electrode assembly comprising, in combination: an elongated electrode having a peripheral annular groove, a dielectric sleeve of deformable plastic telescoped over the electrode and encircling the groove, an elastomeric sealing ring encircling the sleeve opposite the groove, a coupling telescoped over the electrode and sleeve and closely surrounding the sleeve and supporting the sleeve and electrode, and said coupling having annular surface means surrounding the sealing ring and urging it circumferentially radially inwardly forcing the sleeve into said groove and effecting a seal between the electrode and coupling.

11. The invention as defined in claim 10 characterized in that said surface means comprises an annular lip at one end of the coupling coaxial with the telescoped electrode and sleeve with the lip defining a sealing ring entrapping annular pocket, and said lip being rolled inwardly reducing the pocket and tightly squeezing the ring against the sleeve.

12. An electrode assembly comprising, in combination: elongated rod-like and tube-like electrodes telescoped together with an intervening sleeve of deformable dielectric plastic disposed therebetween, said rod-like electrode provided with an annular groove, an O-ring encircling the sleeve beneath the tube-like electrode and held in circumferential and radial compression by the tube-like electrode against the sleeve holding the latter displaced into the groove and effecting a seal between the electrodes, said sleeve terminating short of one end of the rod-like electrode providing an exposed end on the rod-like electrode, said tube-like electrode provided with an annular groove, a sleeve of deformable dielectric plastic telescoped over the tube-like electrode and spaced from that end of the electrode adjacent the exposed end of the rod-like electrode to provide an exposed end on said tube-like electrode, an O-ring encircling the second mentioned sleeve, an electrically conductive coupling telescoped over the electrodes with an annular portion thereof contracted against the second mentioned O-ring circumferentially squeezing it against the underlying sleeve sealing the coupling and tube-like electrode, said coupling having a cylindrical portion coaxial with the electrodes adjacent the exposed ends thereof, and a socket member having a non-conductive bore removably telescoped over said exposed ends of the electrodes and said cylindrical portion of the coupling and provided with internal electrical contacts resiliently embracing said exposed ends and cylindrical portion and connected to leads extending out of the socket member.

13. In an electrode assembly for sensing liquid in a tank, an electrode unit comprising telescopically connected inner and outer electrodes and a coupling telescoped over the electrodes for supporting them on the wall of the tank, said electrodes electrically insulated from each other and having axially spaced apart exposed end portions for contact with liquid in the tank, said electrodes electrically insulated from the coupling, a cylindrical splash shield of dielectric material closely encircling the electrode unit, said shield having a cylindrical portion closely spaced radially from the exposed end of the outer electrode and extending beyond such end toward the exposed end of the inner electrode to provide a chamber about the exposed end of the outer electrode, said shield supported above said exposed end of the outer electrode on the electrode unit, and said shield defining openings at opposite ends of said chamber to establish fluid communication between the chamber and liquid in the tank.

14. The invention as defined in claim 13 characterized in that both ends of the shield are connected to the electrode unit supporting the shield thereon with the chamber being substantialy closed at opposite ends but provided with the openings as aforesaid.

15. The invention as defined in claim 13 characterized in that said shield is supported on the inner electrode adjacent its exposed end with a portion of such end extending beyond the shield for contact with liquid in the tank.

16. In an electrode assembly, an electrode unit comprising telescopically connected inner and outer electrodes electrically insulated from each other and having coaxially arranged exposed cylindrical surfaces at one end of the unit disposed in axially spaced-apart relation, a coupling member telescopically connected to the electrode unit adjacent said exposed ends for supporting the unit in the wall of a tank, a resilient dielectric socket for removable and pivotal telescopic reception over said exposed ends and provided internally with a plurality of axially spaced apart resilient contacts one for slip connection with each of said exposed ends, and said socket having internal wall portions releasably gripping said cylindrical surfaces for connecting the socket to the coupling.

17. A liquid level sensing electrode assembly for projection through and mounting in an opening of a tank comprising: an electrode unit including telescopically connected electrodes electrically insulated from each other and having a pair of axially spaced-apart electrically conductive exposed portions for contact by the liquid whose level is to be sensed in the tank, a splash shield of dielectric material mounted on and carried by the electrode unit and encircling at least one of said portions in closely spaced encircling relation therefrom and extending toward the other exposed portion to provide a quiescent liquid chamber about said encircled portion preventing liquid splash on such portion, said shield having a maximum outside dimension for enabling reception through said opening in the tank wall, and said shield defining openings at opposite ends of the chamber to establish communication between the chamber and the liquid whose level is to be sensed.

18. The invention as defined in claim 17 characterized in that the shield is formed of a dielectric material and is supported on the electrode unit at axially opposite sides of said encircled exposed electrode portion.

References Cited by the Examiner

UNITED STATES PATENTS

| | | | |
|---|---|---|---|
| 1,733,591 | 10/1929 | Gilson | 339—193 |
| 2,798,135 | 7/1957 | Graham | 200—152 |
| 3,174,085 | 3/1965 | Schroeder et al. | 317—242 X |

ROBERT K. SCHAEFER, *Primary Examiner.*

H. HOHAUSER, *Assistant Examiner.*